(12) United States Patent (10) Patent No.: US 8,909,716 B2
Archer et al. (45) Date of Patent: Dec. 9, 2014

(54) ADMINISTERING TRUNCATED RECEIVE FUNCTIONS IN A PARALLEL MESSAGING INTERFACE

(75) Inventors: Charles J. Archer, Rochester, MN (US); Michael A. Blocksome, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 12/892,153

(22) Filed: Sep. 28, 2010

(65) Prior Publication Data

US 2012/0079035 A1 Mar. 29, 2012

(51) Int. Cl.
*G06F 15/16* (2006.01)

(52) U.S. Cl.
CPC ..................... *G06F 15/16* (2013.01)
USPC ............ 709/206; 709/230; 370/401; 711/173

(58) Field of Classification Search
CPC .............. G06F 15/16; G06F 15/17337; G06F 15/17368; G06F 17/30327; G06F 17/30445
USPC .................... 709/206, 230; 370/401; 711/173
See application file for complete search history.

(56) References Cited

U.S. PATENT DOCUMENTS

| | | | |
|---|---|---|---|
| 4,893,303 A | 1/1990 | Nakamura | |
| 5,488,608 A | 1/1996 | Flammer, III | |
| 5,802,278 A | 9/1998 | Isfeld et al. | |
| 6,070,189 A | 5/2000 | Bender et al. | |
| 6,337,852 B1 * | 1/2002 | Desnoyers et al. | 370/236 |
| 6,438,748 B1 | 8/2002 | Gard et al. | |
| 6,519,310 B2 | 2/2003 | Chapple | |
| 6,553,002 B1 | 4/2003 | Bremer et al. | |
| 6,553,031 B1 | 4/2003 | Nakamura et al. | |
| 6,591,310 B1 | 7/2003 | Johnson | |
| 6,601,089 B1 | 7/2003 | Sistare et al. | |
| 6,801,927 B1 | 10/2004 | Smith et al. | |
| 6,847,911 B2 | 1/2005 | Huckaby et al. | |
| 6,847,991 B1 | 1/2005 | Kurapati | |
| 6,993,769 B2 | 1/2006 | Simonson et al. | |

(Continued)

OTHER PUBLICATIONS

Knudson, Brant; "IBM System Blue Gene Solution: Blue Gene/P Application Development," *IBM Redbooks*, pp. 1-406, Sep. 2009.

(Continued)

*Primary Examiner* — Thuong Nguyen
(74) *Attorney, Agent, or Firm* — Biggers Kennedy Lenart Spraggins LLP

(57) ABSTRACT

Administering truncated receive functions in a parallel messaging interface ('PMI') of a parallel computer comprising a plurality of compute nodes coupled for data communications through the PMI and through a data communications network, including: sending, through the PMI on a source compute node, a quantity of data from the source compute node to a destination compute node; specifying, by an application on the destination compute node, a portion of the quantity of data to be received by the application on the destination compute node and a portion of the quantity of data to be discarded; receiving, by the PMI on the destination compute node, all of the quantity of data; providing, by the PMI on the destination compute node to the application on the destination compute node, only the portion of the quantity of data to be received by the application; and discarding, by the PMI on the destination compute node, the portion of the quantity of data to be discarded.

15 Claims, 8 Drawing Sheets

(56) References Cited

U.S. PATENT DOCUMENTS

| | | | |
|---|---|---|---|
| 7,155,560 B2 | 12/2006 | McGrew et al. | |
| 7,237,036 B2 | 6/2007 | Boucher et al. | |
| 7,328,300 B2 | 2/2008 | Bennett | |
| 7,392,352 B2 | 6/2008 | Mithal et al. | |
| 7,418,470 B2 | 8/2008 | Howard et al. | |
| 7,464,138 B2 | 12/2008 | Le et al. | |
| 7,533,197 B2 | 5/2009 | Leonard et al. | |
| 7,552,312 B2 | 6/2009 | Archer et al. | |
| 7,673,011 B2 | 3/2010 | Archer et al. | |
| 7,991,978 B2 | 8/2011 | Kuesel et al. | |
| 8,001,280 B2 | 8/2011 | Blumrich et al. | |
| 8,018,951 B2 | 9/2011 | Blocksome | |
| 8,041,969 B2 | 10/2011 | Archer et al. | |
| 8,250,164 B2 | 8/2012 | Archer et al. | |
| 8,286,188 B1 | 10/2012 | Brief | |
| 2002/0054051 A1 | 5/2002 | Ladd | |
| 2003/0093485 A1 | 5/2003 | Dougall et al. | |
| 2003/0195991 A1 | 10/2003 | Masel et al. | |
| 2005/0166209 A1 | 7/2005 | Merrick et al. | |
| 2005/0289235 A1* | 12/2005 | Suematsu et al. | 709/230 |
| 2006/0059257 A1 | 3/2006 | Collard et al. | |
| 2006/0101104 A1 | 5/2006 | Bhanot et al. | |
| 2006/0182128 A1* | 8/2006 | Nakata et al. | 370/401 |
| 2006/0227774 A1 | 10/2006 | Hoenicke | |
| 2007/0078997 A1 | 4/2007 | Stern | |
| 2007/0124453 A1 | 5/2007 | Slaughter et al. | |
| 2007/0169176 A1 | 7/2007 | Cook et al. | |
| 2007/0169179 A1 | 7/2007 | Narad | |
| 2008/0101295 A1 | 5/2008 | Tomita et al. | |
| 2008/0126739 A1* | 5/2008 | Archer et al. | 711/173 |
| 2008/0281998 A1 | 11/2008 | Archer et al. | |
| 2009/0003344 A1 | 1/2009 | Kumar | |
| 2009/0006808 A1 | 1/2009 | Blumrich et al. | |
| 2009/0006810 A1 | 1/2009 | Almasi et al. | |
| 2009/0007141 A1 | 1/2009 | Blocksome et al. | |
| 2009/0022156 A1 | 1/2009 | Blocksome | |
| 2009/0037377 A1 | 2/2009 | Archer et al. | |
| 2009/0089670 A1 | 4/2009 | Gooding et al. | |
| 2009/0129277 A1 | 5/2009 | Supalov et al. | |
| 2009/0138892 A1 | 5/2009 | Almasi et al. | |
| 2009/0254920 A1 | 10/2009 | Truschin et al. | |
| 2010/0005189 A1 | 1/2010 | Archer et al. | |
| 2010/0036940 A1 | 2/2010 | Carey et al. | |
| 2010/0058356 A1 | 3/2010 | Aho et al. | |
| 2010/0232448 A1 | 9/2010 | Sugumar et al. | |
| 2011/0314255 A1 | 12/2011 | Krishna et al. | |
| 2012/0137294 A1 | 5/2012 | Archer et al. | |
| 2013/0061244 A1 | 3/2013 | Davis et al. | |
| 2013/0061245 A1 | 3/2013 | Faraj | |
| 2013/0067111 A1 | 3/2013 | Archer et al. | |
| 2013/0067206 A1 | 3/2013 | Archer et al. | |
| 2013/0073751 A1 | 3/2013 | Blocksome et al. | |
| 2013/0074097 A1 | 3/2013 | Archer et al. | |
| 2013/0081059 A1 | 3/2013 | Archer et al. | |
| 2013/0091510 A1 | 4/2013 | Archer et al. | |
| 2013/0097263 A1 | 4/2013 | Blocksome et al. | |
| 2013/0097404 A1 | 4/2013 | Blocksome et al. | |
| 2013/0097614 A1 | 4/2013 | Blocksome et al. | |
| 2013/0110901 A1 | 5/2013 | Blocksome et al. | |
| 2013/0117403 A1 | 5/2013 | Archer et al. | |
| 2013/0117761 A1 | 5/2013 | Archer et al. | |
| 2013/0117764 A1 | 5/2013 | Archer et al. | |
| 2013/0124666 A1 | 5/2013 | Archer et al. | |
| 2013/0125135 A1 | 5/2013 | Archer et al. | |
| 2013/0125140 A1 | 5/2013 | Archer et al. | |
| 2013/0174180 A1 | 7/2013 | Blocksome et al. | |
| 2013/0185465 A1 | 7/2013 | Blocksome | |

OTHER PUBLICATIONS

Blocksome, Michael; "Optimizing MPI Collectives using Efficient Intra-node Communication Techniques over the BlueGene/P Supercomputer," *Computer Science IBM Research Report*, Dec. 2010.

Office Action, U.S. Appl. No. 12/892,153, Jun. 1, 2012.

Robinson et al., "A Task Migration Implementation of the Message-Passing Interference", May 1996, IEEE, HPDC 5'96,pp. 61-68.

Office Action, U.S. Appl. No. 12/959,539, Oct. 26, 2012.

Office Action, U.S. Appl. No. 12/892,192, Oct. 30, 2012.

Final Office Action, U.S. Appl. No. 12/892,153, Sep. 25, 2012.

Office Action, U.S. Appl. No. 12/940,300, Sep. 19, 2012.

Office Action, U.S. Appl. No. 12/963,694, Dec. 24, 2012.

Office Action, U.S. Appl. No. 13/290,670, Dec. 17, 2012.

Office Action, U.S. Appl. No. 13/290,642, Jan. 7, 2013.

U.S. Appl. No. 12/985,651, Jan. 6, 2011.

U.S. Appl. No. 13/290,670, Nov. 7, 2011.

U.S. Appl. No. 13/290,642, Nov. 7, 2011.

U.S. Appl. No. 13/292,293, Nov. 9, 2011.

U.S. Appl. No. 13/659,370, Oct. 24, 2012.

U.S. Appl. No. 13/659,458, Oct. 24, 2012.

U.S. Appl. No. 13/668,503, Nov. 5, 2012.

U.S. Appl. No. 13/671,762, Nov. 8, 2012.

U.S. Appl. No. 13/673,188, Nov. 9, 2012.

U.S. Appl. No. 13/677,993, Nov. 15, 2012.

U.S. Appl. No. 13/678,799, Nov. 16, 2012.

U.S. Appl. No. 13/677,507, Nov. 15, 2012.

U.S. Appl. No. 13/679,042, Nov. 16, 2012.

U.S. Appl. No. 13/690,168, Nov. 30, 2012.

U.S. Appl. No. 13/681,903, Nov. 20, 2012.

U.S. Appl. No. 13/680,772, Nov. 19, 2012.

Notice of Allowance, U.S. Appl. No. 12/985,651, Feb. 20, 2014, pp. 1-14.

Notice of Allowance, U.S. Appl. No. 13/659,370, Mar. 13, 2014, pp. 1-15.

Kumar et al., "The Deep Computing Messaging Framework: Generalized Scalable Message Passing Blue Gene/P Supercomputer", Proceedings of the 22nd Annual International Conference on Supercomputing (ICS '08), Jun. 2008, pp. 94-103, ACM New York, USA.

Banikazemi et al., "MPI-LAPI: An Efficient Implementation of MPI for IBM RS/6000 SP Systems", IEEE Transactions on Parallel and Distributed Systems, Oct. 2001, vol. 12, Issue 10, pp. 1081-1093, IEEE Xplore Digital Library (online publication), IEEE.org, USA, DOI: 10.1109/71.963419.

Myricom, "Myrinet Express (MX): A High-Performance, Low-Level, Message-Passing Interface for Myrinet", Myricom.com (online publication), Version 1.2, Oct. 2006, pp. 1-65, Myricom Inc., USA.

Dinan et al., "Hybrid Parallel Programming With MPI and Unified Parallel C", Proceedings of the 7th ACM International Conference on Computing Frontiers (CF'10), May 2010, pp. 177-186, ACM New York, USA.

Dozsa et al., "Enabling Concurrent Multithreaded MPI Communication on Multicore Petascale Systems", Proceedings of The 17th European MPI Users' Group Meeting Conference on Recent Advances In The Message Passing Interface (EuroMPI'10), Apr. 2010, pp. 11-20 (reprinted pp. 1-9), Springer-Verlag Berlin, Heidelberg.

Foster et al., "Managing Multiple Communication Methods in High-Performance Networked Computing Systems", Journal of Parallel and Distributed Computing , vol. 40, Issue 1, Jan. 1997, pp. 1-25, (online publication), ScienceDirect.com, USA.

Robinson et al., "A Task Migration Implementation of the Message-Passing Interface", Proceedings of the 5th IEEE International Symposium on High Performance Distributed Computing (HPDC'96), May 1996, pp. 61-68, IEEE Computer Society, Washington DC, USA.

Final Office Action, U.S. Appl. No. 12/892,192 May 2, 2013.

Office Action, U.S. Appl. No. 12/892,192, Sep. 30, 2013.

Notice of Allowance, U.S. Appl. No. 13/007,860, Jul. 3, 2013.

Office Action, U.S. Appl. No. 12/892,153, Apr. 25, 2013.

Final Office Action, U.S. Appl. No. 12/892,153, Aug. 14, 2013.

Office Action, U.S. Appl. No. 12/985,611, Aug. 2, 2013.

Office Action, U.S. Appl. No. 13/007,848, May 15, 2013.

Final Office Action, U.S. Appl. No. 13/007,848, Sep. 13, 2013.

Notice of Allowance, U.S. Appl. No. 12/963,671, Sep. 18, 2013.

Final Office Action, U.S. Appl. No. 12/940,198, Aug. 14, 2013.

Final Office Action, U.S. Appl. No. 12/940,259, Aug. 14, 2013.

Final Office Action, U.S. Appl. No. 12/940,282, Sep. 10, 2013.

(56) References Cited

OTHER PUBLICATIONS

Notice of Allowance, U.S. Appl. No. 12/940,300, Apr. 29, 2013.
Notice of Allowance, U.S. Appl. No. 12/963,694, Jun. 18, 2013.
Office Action, U.S. Appl. No. 12/985,651, Aug. 5, 2013.
Notice of Allowance, U.S. Appl. No. 13/290,670, Mar. 27, 2013.
Notice of Allowance, U.S. Appl. No. 13/290,642, May 1, 2013.
Office Action, U.S. Appl. No. 13/292,293, Jul. 19, 2013.
Office Action, U.S. Appl. No. 13/659,370, Oct. 21, 2013.
Final Office Action, U.S. Appl. No. 13/668,503, Jul. 11, 2013.
Office Action, U.S. Appl. No. 13/671,762, May 13, 2013.
Final Office Action, U.S. Appl. No. 13/671,762, Sep. 13, 2013.
Office Action, U.S. Appl. No. 13/673,188, Jul. 25, 2013.
Final Office Action, U.S. Appl. No. 13/678,799, Aug. 30, 2013.
Final Office Action, U.S. Appl. No. 13/677,507, Aug. 22, 2013.
Office Action, U.S. Appl. No. 13/676,700, Jun. 5, 2013.
Office Action, U.S. Appl. No. 13/690,168, Aug. 15, 2013.
Notice of Allowance, U.S. Appl. No. 13/681,903, Sep. 30, 2013.
Office Action, U.S. Appl. No. 13/680,772, Aug. 15, 2013.
Office Action, U.S. Appl. No. 13/710,066, Jul. 19, 2013.
Notice of Allowance, U.S. Appl. No. 13/709,305, Aug. 27, 2013.
Final Office Action, U.S. Appl. No. 13/711,108, Jul. 5, 2013.
Notice of Allowance, U.S. Appl. No. 13/711,108, Sep. 19, 2013.
Notice of Allowance, U.S. Appl. No. 13/784,198, Sep. 20, 2013.
Final Office Action, U.S. Appl. No. 12/956,903, Nov. 6, 2013.
Notice of Allowance, U.S. Appl. No. 13/292,293, Nov. 7, 2013.
Introduction to Parallel Computing and the Message Passing Interface (MPI), Kuiper, 2008, pp. 1-39.
Parallel net DCF A High-Performance Scientific I/O Interface, Li et al., 2003, pp. 1-11.
HPSS MPI-IO: A Standard Parallel Interface to HPSS File System, Loewe, 2001, pp. 1-19.
Notice of Allowance, U.S. Appl. No. 12/959,455, Mar. 1, 2013.
Notice of Allowance, U.S. Appl. No. 12/959,539, Mar. 6, 2013.
Office Action, U.S. Appl. No. 13/007,860, Mar. 19, 2013.
Office Action, U.S. Appl. No. 12/963,671, Mar. 1, 2013.
Office Action, U.S. Appl. No. 12/940,198, Feb. 14, 2013.
Office Action, U.S. Appl. No. 12/940,282, Feb. 5, 2013.
Office Action, U.S. Appl. No. 13/668,503, Feb. 13, 2013.
Office Action, U.S. Appl. No. 13/673,188, Mar. 5, 2013.
Office Action, U.S. Appl. No. 13/678,799, Feb. 5, 2013.
Office Action, U.S. Appl. No. 13/681,903, Apr. 2, 2013.
Office Action, U.S. Appl. No. 13/709,305, Mar. 25, 2013.
Office Action, U.S. Appl. No. 13/711,108, Mar. 22, 2013.
Foster et al., Managing Multiple Communication Method in High-Performance Networked Computing Systems. http://www.mcs.anl.gov/nexus, 1997, pp. 1-25.
Robinson et al., "A Task Migration Implementation of the Message-Passing Interface", May 1996, IEEE, HPDC-5'96, pp. 61-68.
A Message Passing Interface for Parallel and Distributed Computing, Hairi et al., 1993, pp. 1-8.

\* cited by examiner

ADMINISTERING TRUNCATED RECEIVE FUNCTIONS IN A PARALLEL MESSAGING INTERFACE

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for administering truncated receive functions in a parallel messaging interface of a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Collective operations that involve data communications amongst many compute nodes may be carried out with a variety of algorithms. That is, the end result of a collective operation may be achieved in various ways. Some algorithms may provide better performance than other algorithms when operating in particular configurations. What is needed therefore is a way to optimize the selection of the best performing algorithm or set of algorithms to carry out collective operations in particular operating configurations.

SUMMARY OF THE INVENTION

Methods, apparatus, and products for administering truncated receive functions in a parallel messaging interface ('PMI') of a parallel computer that includes a plurality of compute nodes coupled for data communications through the PMI and through a data communications network, including: sending, through the PMI on a source compute node, a quantity of data from the source compute node to a destination compute node; specifying, by an application on the destination compute node, a portion of the quantity of data to be received by the application on the destination compute node and a portion of the quantity of data to be discarded; receiving, by the PMI on the destination compute node, all of the quantity of data; providing, by the PMI on the destination compute node to the application on the destination compute node, only the portion of the quantity of data to be received by the application; and discarding, by the PMI on the destination compute node, the portion of the quantity of data to be discarded.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
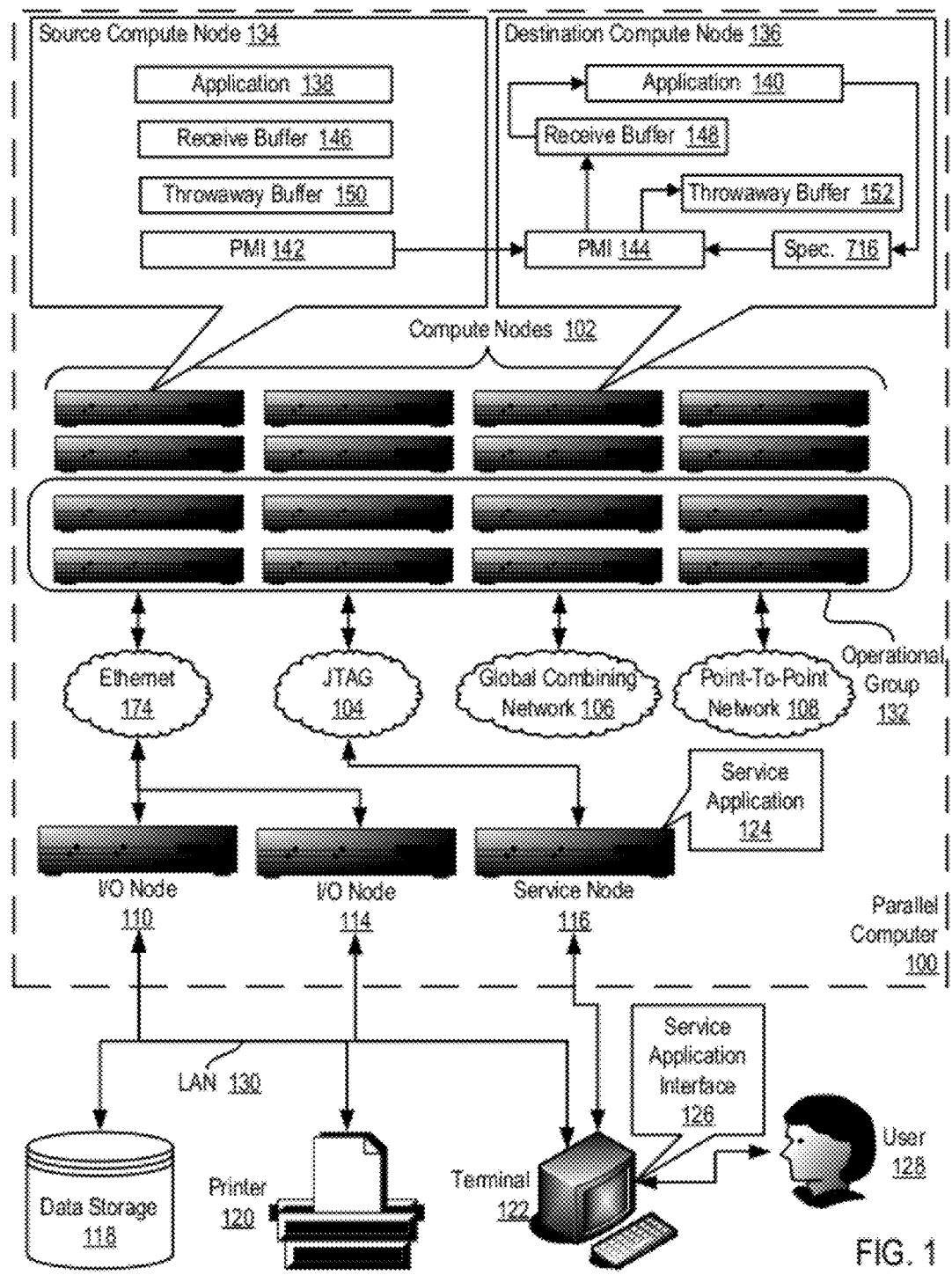
FIG. 1 sets forth example apparatus for administering truncated receive functions in a PMI of a parallel computer according to embodiments of the present invention.

Example methods, apparatus, and products for administering truncated receive functions in a PMI of a parallel computer in accordance with the present invention are described with reference to the accompanying drawings, beginning with FIG. 1. FIG. 1 sets forth example apparatus for administering truncated receive functions in a PMI of a parallel computer (100) according to embodiments of the present invention. The apparatus of FIG. 1 includes a parallel computer (100), non-volatile memory for the computer in the form of a data storage device (118), an output device for the computer in the form of a printer (120), and an input/output device for the computer in the form of a computer terminal (122). The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of a operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of a operational group. A 'reduce' operation is an example of a collective operation that executes arithmetic or logical functions on data distributed among the compute nodes of a operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for performing an allreduce operation using shared memory according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

The parallel computer (100) of FIG. 1 operates generally for administering truncated receive functions in a PMI of the parallel computer (100). Such a parallel computer (100) is typically composed of many compute nodes, but for ease of explanation two of the compute nodes in this example are referenced in particular, a source compute node (134) and a destination compute node (136). Each compute node includes a data processing application (138, 140), a receive buffer (146, 148), a throwaway buffer (150, 152), and a PMI (142, 144). Each PMI (142, 144) is a module of computer program instructions for data communications on parallel computers. Each PMI (142, 144) provides a collection of data communications operations that are invoked by data communications libraries such as, for example, MPI which is described in greater detail above in this specification. Each PMI (142, 144) may alternatively provide a collection of data communications operations that are invoked directly by the applications (138, 140).

In the example of FIG. 1, the PMI (142) on the source compute node (134) sends a quantity of data from the source compute node (134) to the destination compute node (136). In the example of FIG. 1, the quantity of data may be sent from the source compute node (134) to the destination compute node (136), for example, via the global combining network (106) of the point-to-point network (108).

In the example of FIG. 1, the application (140) on the destination compute node (136) specifies a portion of the quantity of data to be received by the application (140) on the destination compute node (136) and a portion of the quantity of data to be discarded. In the example of FIG. 1, the portion of the quantity of data to be received by the application (140) on the destination compute node (136) and the portion of the quantity of data to be discarded may be specified using a data structure that identifies various portions of the quantity of data that are to be received by the application (140) as well as various portions of the quantity of data that are not to be received by the application. Such a specification (716) may be embodied, for example, as a C-style struct, a list, or other data structure as will occur to those of skill in the art.

In the example of FIG. 1, the application (140) on the destination compute node (136) may specify a portion of the quantity of data to be received by the application (140) on the destination compute node (136) and a portion of the quantity of data to be discarded by specifying the beginning portion of the quantity of data as the portion of the quantity of data to be received by the application and specifying the ending portion of the quantity of data as the portion of the quantity of data to be discarded. In the example of FIG. 1, the application (140) on the destination compute node (136) specifies the beginning portion of the quantity of data as the portion of the quantity of data to be received by the application and specifies the ending portion of the quantity of data as the portion of the quantity of data to be discarded, for example, by specifying a data structure in which a first portion of a predetermined size is identified as the portion of the quantity of data to be received by the application (140) and a second portion of a predetermined size is identified as the portion of the quantity of data that is to be discarded. The following C-style struct is an example of such a data structure:

```
struct specification {
    byte keep1;
    byte keep2;
    byte discard1;
    byte discard2;
    byte discard3;
    byte discard4;
    byte discard5;
    byte discard6;
};
```

In the example of FIG. 1, the application (140) on the destination compute node (136) may specify a portion of the quantity of data to be received by the application (140) on the destination compute node (136) and a portion of the quantity of data to be discarded by specifying the ending portion of the quantity of data as the portion of the quantity of data to be received by the application and specifying the beginning portion of the quantity of data as the portion of the quantity of data to be discarded. In the example of FIG. 1, the application (140) on the destination compute node (136) specifies the ending portion of the quantity of data as the portion of the quantity of data to be received by the application and specifying the beginning portion of the quantity of data as the portion of the quantity of data to be discarded, for example, by specifying a data structure in which a first portion of a predetermined size is identified as the portion of the quantity of data to be discarded and a second portion of a predetermined size is identified as the portion of the quantity of data that is to be received by the application (140). The following C-style struct is an example of such a data structure:

```
struct specification {
    byte discard1;
    byte discard2;
    byte discard3;
    byte discard4;
    byte discard5;
    byte discard6;
    byte keep1;
    byte keep2;
};
```

In the example of FIG. 1, the application (140) on the destination compute node (136) may specify a portion of the quantity of data to be received by the application (140) on the destination compute node (136) and a portion of the quantity of data to be discarded by specifying an ordering of one or more portions of the quantity of data to be received by the application, one or more portions of the quantity of data to be discarded, and specifying a length for each portion. In the example of FIG. 1, the application (140) on the destination compute node (136) specifies an ordering of one or more portions of the quantity of data to be received by the application, one or more portions of the quantity of data to be discarded, and specifying a length for each portion, for example, by specifying a data structure in which one or more portions of a predetermined size are identified as the portion of the quantity of data to be discarded and one or more portions of a predetermined size are identified as the portion of the quantity of data that is to be received by the application (140). The following C-style struct is an example of such a data structure:

```
struct specification {
    byte discard1;
    byte keep1;
    byte discard2;
    byte discard3;
    byte discard4;
    byte keep2;
    byte discard5;
    byte discard6;
};
```

In the example of FIG. 1, the PMI (144) executing on the destination compute node (136) receives all of the quantity of data from the source node (134). In the example of FIG. 1, the destination compute node (136) may receive all of the quantity of data from the source compute node (134) via a data communications network such as, for example, the global combining network (106) or the point-to-point network (108).

In the example of FIG. 1, the PMI (144) on the destination compute node (136) provides, to the application (140) on the destination compute node (136), only the portion of the quantity of data to be received by the application (140). The PMI (144) on the destination compute node (136) identifies the one or more portions of the quantity of data to be received by the application (140) in dependence upon the specification of the portion of the quantity of data to be received by the application (140) and the specification of the portion of the quantity of data to be discarded that was specified by the application (140). In the example of FIG. 1, the PMI (144) on the destination compute node (136) provides only the one or more portions of the quantity of data to be received by the application (140) by writing the one or more portions of the quantity of data to be received by the application (140) into the receive buffer (148) on the destination compute node (136).

In the example of FIG. 1, the PMI (144) on the destination compute node (136) discards the one or more portions of the quantity of data that are to be discarded. In the example of FIG. 1, the one or more portions of the quantity of data to be discarded are determined in dependence upon the specification of the portion of the quantity of data to be received by the application (140) and the specification of the portion of the quantity of data to be discarded that was specified by the application (140). In the example of FIG. 1, the PMI (144) on the destination compute node (136) discards the one or more portions of the quantity of data to be discarded by writing the one or more portions of the quantity of data to be discarded to a predefined throwaway buffer (152) on the destination compute node (136). The size of the throwaway buffer (152) of FIG. 1 may be smaller than the size of the portion of the quantity of data to be discarded, such that the PMI (144) on the destination compute node (136) discards the portion of the quantity of data to be discarded by writing sub-portions of the quantity of data to be discarded to the throwaway buffer (152) individually, with each subsequent sub-portion that is written to the throwaway buffer (152) overwriting the portion that was previously written to throwaway buffer (152).

In the example of FIG. 1, two of the compute nodes (102) of the parallel computer (100) are designated as a source compute node (134) and a destination compute node (136) based on the flow of data from the source compute node (134) to the destination compute node (136). Readers will understand that in a different data communications transaction, the compute node designated as the source compute node (134) could operate as the destination compute node (136), and the destination compute node (136) could operate as the source compute node (134). In fact, in some instances the source compute node (134) and the destination compute node (136) could actually be the same physical compute node, for example, when multiple processes executing on the same physical compute node exchange data. Because each compute node (134, 136) may operate as a source or destination in a particular data exchange, each compute node (134, 136) includes an application (138, 140), a PMI (142, 144), a receive buffer (146, 148), and a throwaway buffer (150, 152).

The arrangement of nodes, networks, and I/O devices making up the example apparatus illustrated in FIG. 1 are for explanation only, not for limitation of the present invention. Apparatus capable of administering truncated receive functions in a PMI of a parallel computer according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of administering truncated receive functions in a PMI of the parallel computer according to embodiments of the present invention sometimes include thousands of compute nodes. In addition to Ethernet (174) and JTAG (104), networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Administering truncated receive functions in a PMI of a parallel computer according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of administering truncated receive functions in a PMI of a parallel computer according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. Application program (159) executes collective operations by calling software routines in parallel communications library (161). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Also stored in RAM (156) is a PMI (202). The PMI (202) is a module of computer program instructions for data communications on parallel computers. The PMI (202) provides a collection of data communications operations that are invoked by data communications libraries such as, for example, MPI which is described in greater detail above in this specification. The PMI (202) may alternatively provide a collection of data communications operations that are invoked directly by the application program (159).

Figure 2:
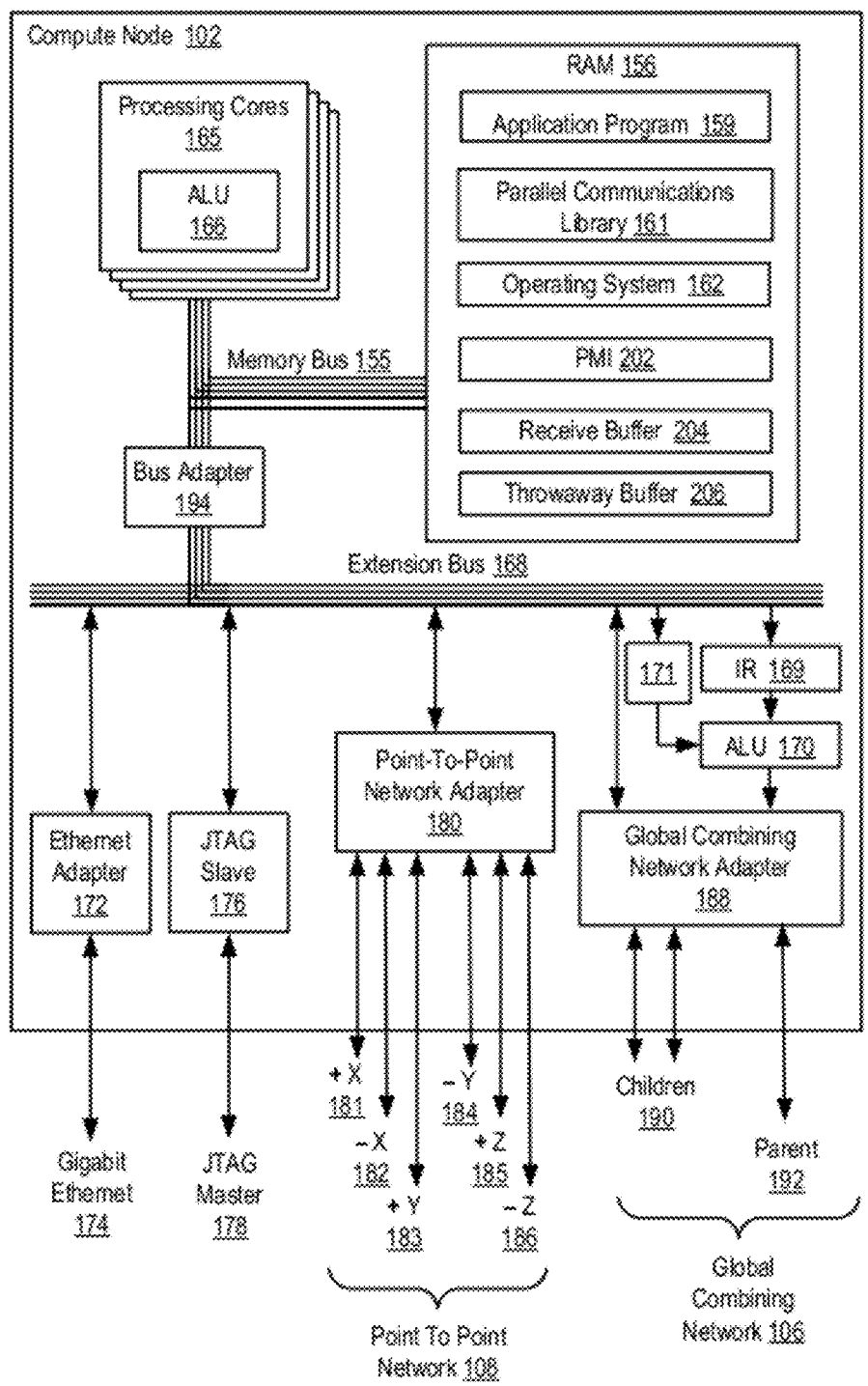
FIG. 2 sets forth a block diagram of an example compute node useful in a parallel computer capable of administering truncated receive functions in a PMI of a parallel computer according to embodiments of the present invention.

Also stored in RAM (156) is a receive buffer (204) and a throwaway buffer (206). In the example of FIG. 2 the receive buffer (204) may be embodied as computer memory for receiving one or more portions of data to be used by the application (159). In the example of FIG. 2 the throwaway buffer (206) may be embodied as computer memory for discarding one or more portions of data that are not to be used by the application (159).

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus that administer truncated receive functions in a PMI (202) of a parallel computer include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes for administering truncated receive functions in a PMI of a parallel computer according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being performed in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
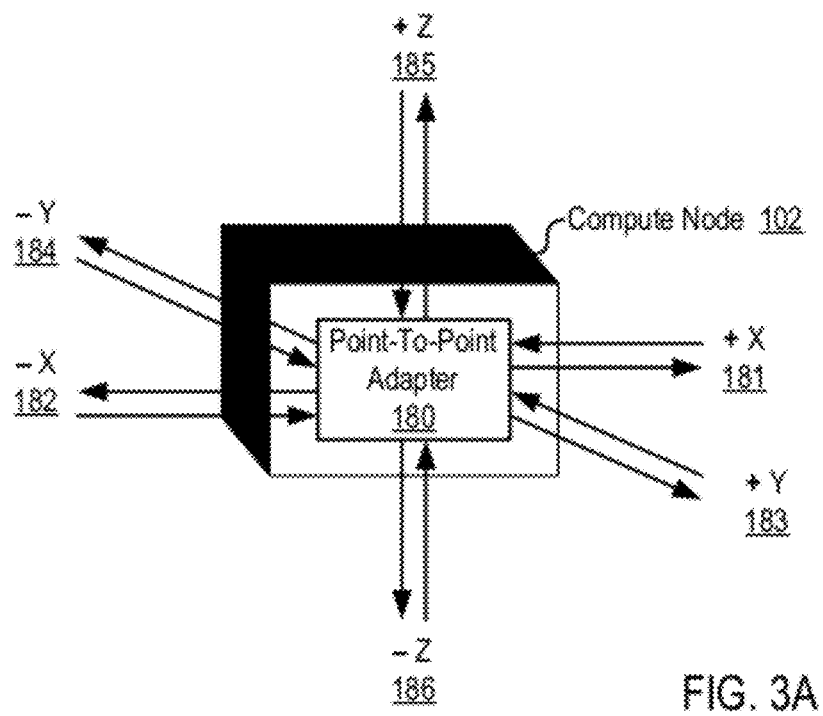
FIG. 3A sets forth a block diagram of an example Point-To-Point Adapter useful in systems for administering truncated receive functions in a PMI of a parallel computer according to embodiments of the present invention.

For further explanation, FIG. 3A sets forth a block diagram of an example Point-To-Point Adapter (180) useful in systems for administering truncated receive functions in a PMI of a parallel computer according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
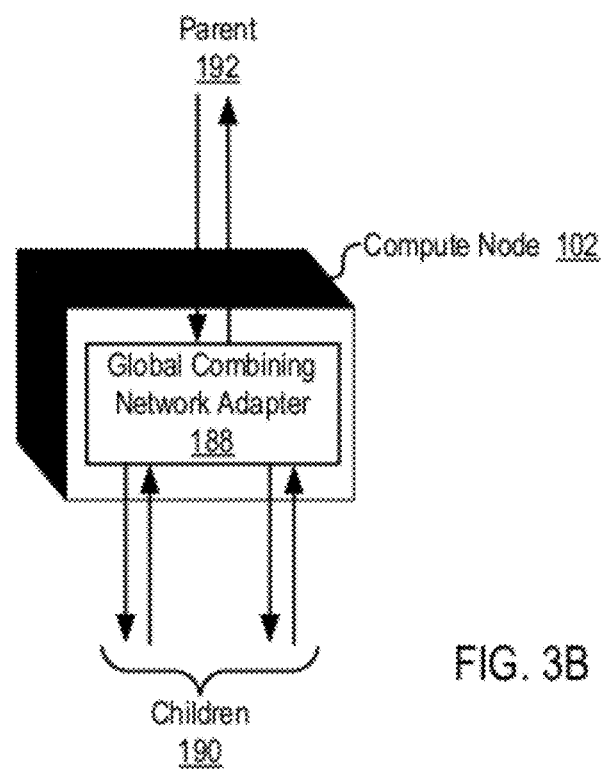
FIG. 3B sets forth a block diagram of an example Global Combining Network Adapter useful in systems for administering truncated receive functions in a PMI of a parallel computer according to embodiments of the present invention.

For further explanation, FIG. 3B sets forth a block diagram of an example Global Combining Network Adapter (188) useful in systems for administering truncated receive functions in a PMI of a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
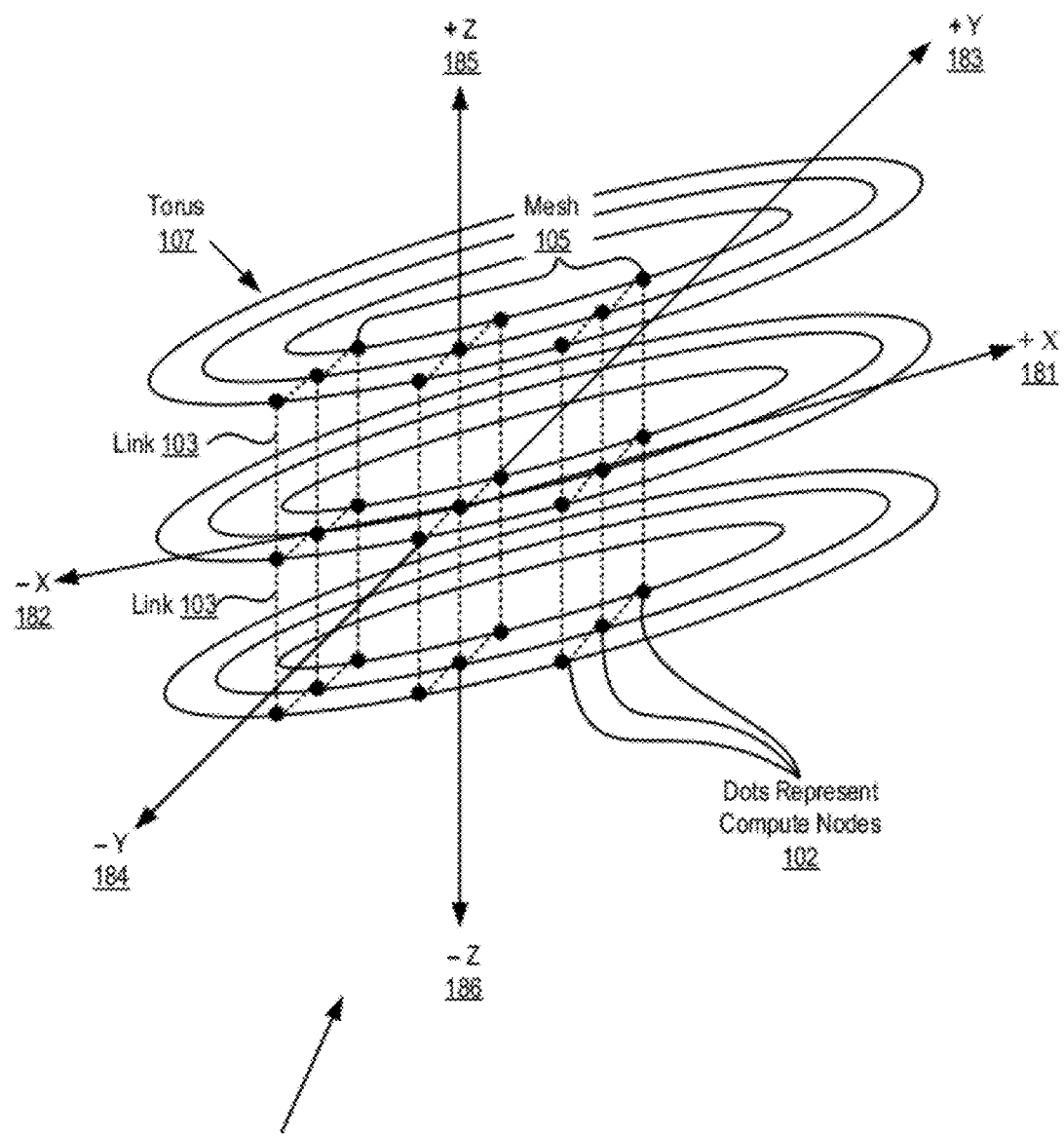
FIG. 4 sets forth a line drawing illustrating an example data communications network optimized for point-to-point operations useful in systems capable of administering truncated receive functions in a PMI of a parallel computer according to embodiments of the present invention.

For further explanation, FIG. 4 sets forth a line drawing illustrating an example data communications network (108) optimized for point-to-point operations useful in systems capable of administering truncated receive functions in a PMI of a parallel computer according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in administering truncated receive functions in a PMI of a parallel computer in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in administering truncated receive functions in a PMI of a parallel computer in accordance with embodiments of the present invention may in facet be implemented in two dimensions, four dimensions, five dimensions, and so on. Several supercomputers now use five dimensional mesh or torus networks, including, for example, IBM's Blue Gene Q™.

Figure 5:
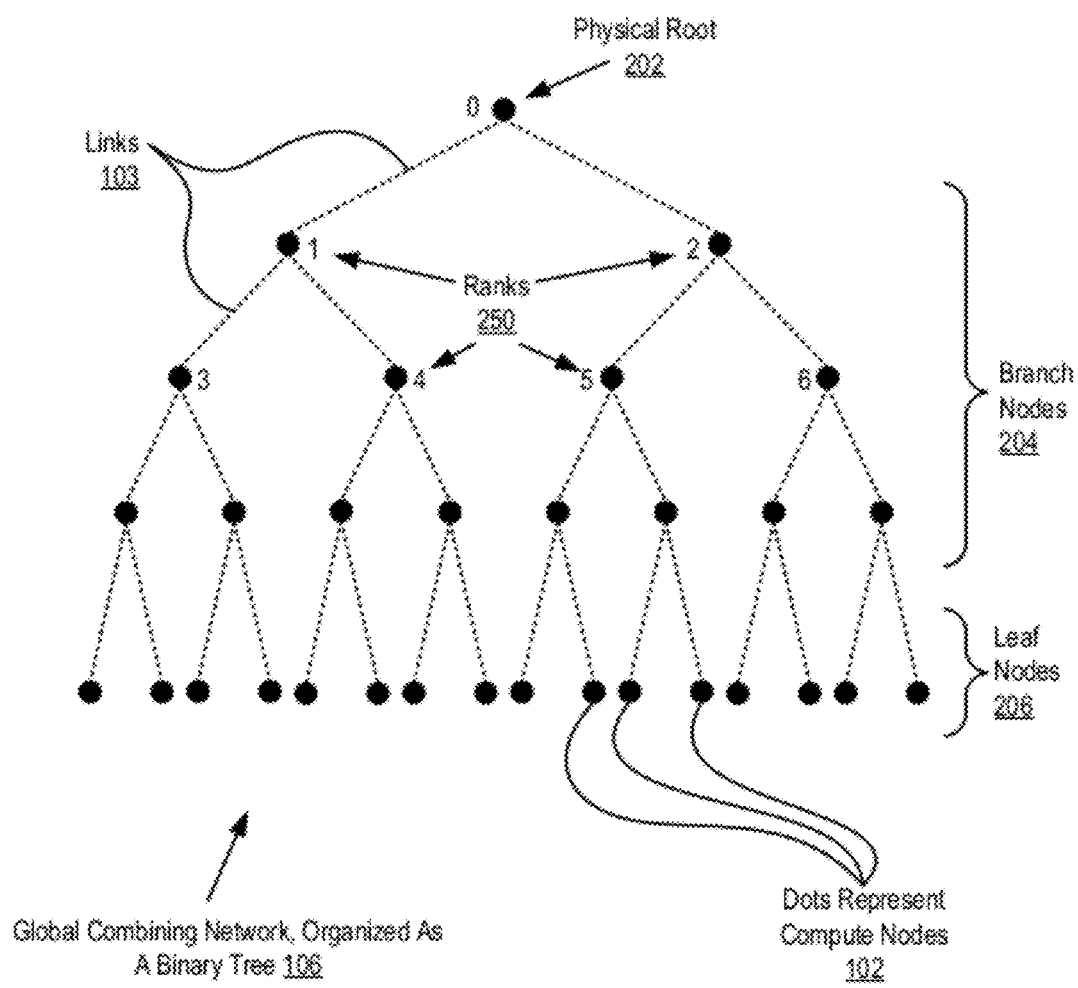
FIG. 5 sets forth a line drawing illustrating an example global combining network useful in systems capable of administering truncated receive functions in a PMI of a parallel computer according to embodiments of the present invention.

For further explanation, FIG. 5 sets forth a line drawing illustrating an example global combining network (106) useful in systems capable of administering truncated receive functions in a PMI of a parallel computer according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in administering truncated receive functions in a PMI of a parallel computer in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
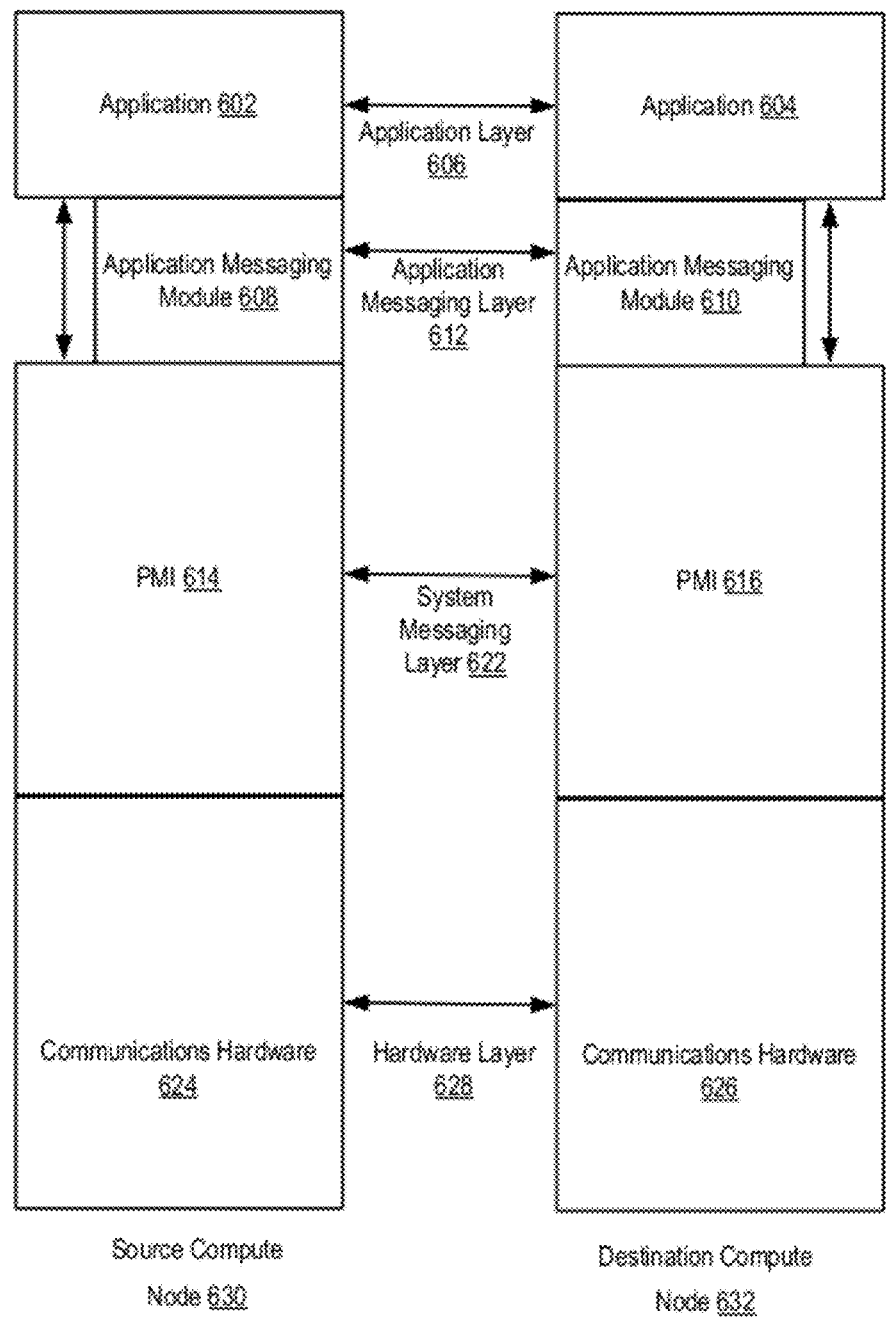
FIG. 6 sets forth a block diagram illustrating an exemplary communications architecture illustrated as a protocol stack useful in administering truncated receive functions in a PMI of a parallel computer according to embodiments of the present invention.

FIG. 6 sets forth a block diagram illustrating an exemplary communications architecture illustrated as a protocol stack useful in administering truncated receive functions in a PMI of a parallel computer according to embodiments of the present invention. The exemplary communications architecture of FIG. 6 sets forth two compute nodes, source compute node (630) and a destination compute node (632). Only two compute nodes are illustrated in the example of FIG. 6 for ease of explanation and not for limitation. In fact, administering truncated receive functions in a PMI of a parallel computer according to embodiments of the present invention may be implemented using many compute nodes in very large scale computer systems such as parallel computers with thousands of nodes.

The exemplary communications architecture of FIG. 6 includes an application layer (606) that implements communications between applications (602, 604) running on the compute nodes (630, 632) by invoking functions in an application messaging module (608, 610) installed on each compute node (630, 632). Communications among the applications (602, 604) in the application layer (606) are effected through messages passed between applications. Applications may communicate messages invoking function of an application programming interface ('API') exposed by the application messaging modules (608, 610).

The exemplary communications architecture of FIG. 6 includes a system messaging layer (622) that implements system specific protocols for communications that support messaging in the application layer (606) and the application messaging layer (612). Such system specific protocols are typically invoked through a set of APIs that are exposed to the application messaging modules (608, 610) in the application messaging layer (612). Such system specific protocols used for communications in the system messaging layer (622) are typically isolated from the application layer (606) making the application layer somewhat independent of system specific details. In the example of FIG. 6, however, communications in the system messaging layer (622) is carried out using a PMI (614) on the source compute node (630) and a PMI (616) on the destination compute node (632). Each PMI (614, 616) provides a collection of data communications operations that may be invoked by the application messaging modules (608, 610) or invoked directly by the applications (602, 604).

The exemplary communications architecture of FIG. 6 includes a hardware layer (628) that defines the physical implementation and the electrical implementation of aspects of the communications hardware (624, 626) on the compute nodes such as the bus, network cabling, connector types, physical data rates, data transmission encoding and may other factors for communications between the compute nodes (630, 632) on the physical network medium.

Figure 7:
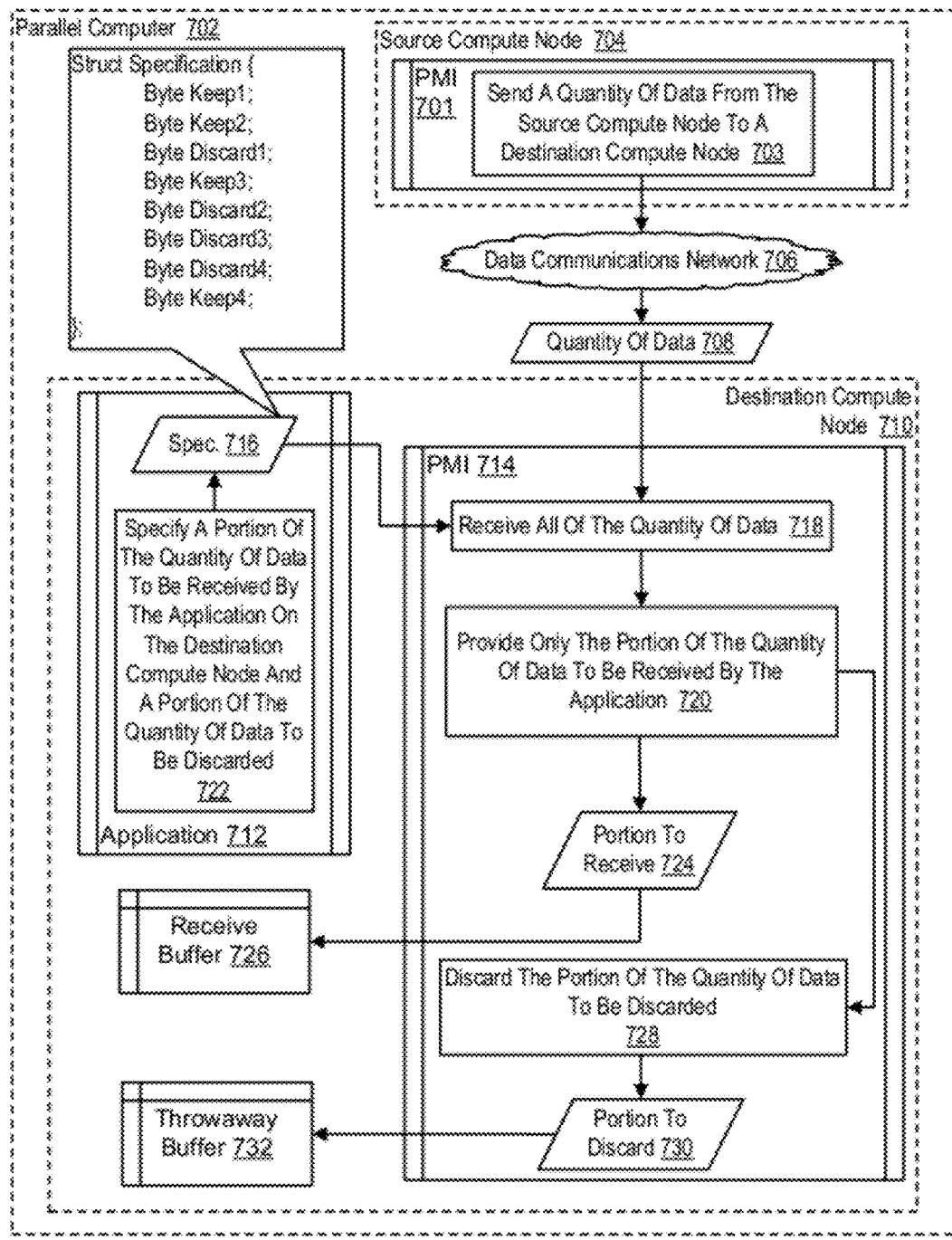
FIG. 7 sets forth a flow chart illustrating an example method for administering truncated receive functions in a PMI of a parallel computer according to embodiments of the present invention.

For further explanation, FIG. 7 sets forth a flow chart illustrating an example method for administering truncated receive functions in a PMI of a parallel computer (702) according to embodiments of the present invention. In the example of FIG. 7, the parallel computer (702) includes a plurality of compute nodes, such as a destination compute node (710) and a source compute node (704), that are coupled for data communications through the PMI (701, 714) on each compute node (704, 710) and through a data communications network (706). In the example of FIG. 7, the data communications network (706) may be embodied, for example, as a Global Combining Network or a Point-to-Point Network as described with reference to FIGS. 1-5.

The method of FIG. 7 includes sending (703), through the PMI (701) on the source compute node (704), a quantity of data (708) from the source compute node (704) to the destination compute node (710). In the method of FIG. 7, sending (703) a quantity of data (708) from the source compute node (704) to the destination compute node (710) may be carried out, for example, by utilizing data communications operations provided by the PMI to send a message from the source compute node (704) to the destination compute node (710) over the data communications network (706).

The example of FIG. 7 includes specifying (722), by an application (712) on the destination compute node (710), a portion of the quantity of data to be received (708) by the application (712) on the destination compute node (710) and a portion of the quantity of data (708) to be discarded. In the example of FIG. 7, such a specification (716) is implemented as a data structure that identifies various portions of the quantity of data (708) that are to be received by the application (712) as well as various portions of the quantity of data (708) that are not to be received by the application (712). Such a specification (716) may be embodied, for example, as a C-style struct as illustrated in FIG. 7.

The example of FIG. 7 defines a C-style structure named 'specification' that includes an eight byte specification. According to this specification, the first, second, fourth, and eighth bytes of an eight byte quantity of data (708) are to be received by the application (712). The specification also indicates that the third, fifth, sixth, and seventh bytes of an eight byte quantity of data (708) are to be discarded. In the example of FIG. 7, such a specification (716) may be specified, for example, because only the first, second, fourth, and eighth bytes of an eight byte quantity of data (708) contain data that is usable by the application (712). Readers will appreciate that the specification (716), according to embodiments of the present application, may be specified (722) using other data structures such as, for example, a record, an array, a list, and so on.

The example of FIG. 7 also includes receiving (718), by the PMI (714) on the destination compute node (710), all of the quantity of data (708). In the example of FIG. 7, the source compute node (704) may send the quantity of data (708) to the destination compute node (710) via the data communications network (706). In the example of FIG. 7, the PMI (714) on the destination compute node (710) uses the specification (716) to identify those portions of the quantity of data (708) that are to be received by the application (712) as well as those portions of the quantity of data (708) that are to be discarded.

The example of FIG. 7 also includes providing (720), by the PMI (714) on the destination compute node (710), only the portion (724) of the quantity of data (708) to be received by the application (712). In the example of FIG. 7, the portion (724) of the quantity of data (708) to be received by the application (712) is determined in dependence upon the specification (716). In the example of FIG. 7, providing (720) the portion (724) of the quantity of data (708) to be received by the application (712) is carried out by writing the portion (724) of the quantity of data (708) to be received into a receive buffer (726) that is predefined by the application (712). In the example of FIG. 7, the receive buffer (726) can therefore function as an input buffer for the application (712) that includes data to be processed by the application (712).

The example of FIG. 7 also includes discarding (728), by the PMI (714) on the destination compute node (710), the portion (730) of the quantity of data (708) to be discarded. In the example of FIG. 7, the portion (730) of the quantity of data (708) to be discarded is determined in dependence upon the specification (716). In the example of FIG. 7, discarding (728) the portion (730) of the quantity of data (708) to be discarded is carried out by writing the portion (730) of the quantity of data (708) to be discarded to a predefined throwaway buffer (732). The size of the throwaway buffer (732) of FIG. 7 may be smaller than the size of the data to be discarded, such that discarding (728) the portion (730) of the quantity of data (708) to be discarded requires that sub-portions of the quantity of data (708) to be discarded are written to the throwaway buffer (732) individually, with each subsequent sub-portion that is written to the throwaway buffer (732) overwriting the sub-portion that was previously written to throwaway buffer (732).

Consider an example in which a 64 byte quantity of data is received, the 8 byte specification (716) of FIG. 7 is specified, and a throwaway buffer with a size of 1 byte is available. In such an example, the 8 byte specification (716) will be applied to the 64 byte quantity of data a total of 8 times to process the entire quantity of data that was received. For each 8 byte segment of the 64 byte quantity of data, the first, second, fourth, and eighth bytes are to be received by the application and the third, fifth, sixth, and seventh bytes are to be discarded. Given that the throwaway buffer in this example has a size of 1 byte, discarding the third, fifth, sixth, and seventh bytes of an 8 byte specification can be carried out by writing the third byte to the throwaway buffer, then writing the fifth byte to the throwaway buffer, then writing the sixth byte to the throwaway buffer, and finally writing the seventh byte to the throwaway buffer. In such an example, all write operations that are executed after the initial write operation will overwrite the value placed in the throwaway buffer by the preceding write operation, effectively discarding the value placed in the throwaway buffer by the preceding write operation.

Figure 8:
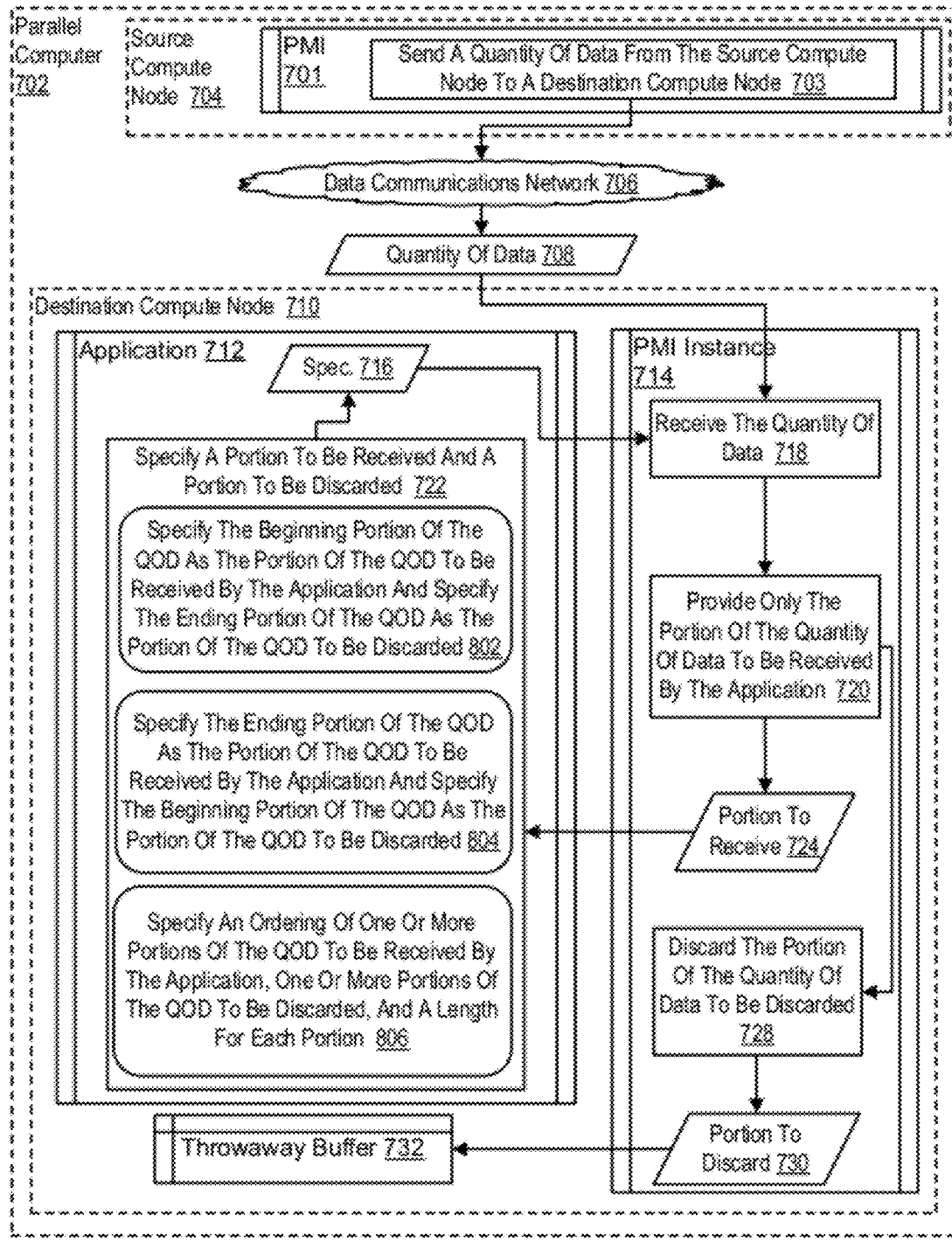
FIG. 8 sets forth a flow chart illustrating an example method for administering truncated receive functions in a PMI of a parallel computer according to embodiments of the present invention.

For further explanation, FIG. 8 sets forth a flow chart illustrating an example method for administering truncated receive functions in a PMI of a parallel computer (702) according to embodiments of the present invention. The example of FIG. 8 is similar to the example of FIG. 7 as it also includes sending (703) a quantity of data from the source compute node (704) to the destination compute node (710), specifying (722) a specification (716) of the portion of a quantity of data (708) to be received by the application (712) and the portion of the quantity of data (708) to be discarded, receiving (718) the quantity of data (708), providing (720) only the portion (724) of the quantity of data (708) to be received by the application (712), and discarding (728) the portion (730) of the quantity of data (708) to be discarded as described with reference to FIG. 7.

In the example of FIG. 8, specifying (722) a specification (716) of one or more portions of a quantity of data (708) to be received by the application (712) and one or more portions of the quantity of data (708) to be discarded can include specifying (802) the beginning portion of the quantity of data (708) as the portion of the quantity of data (708) to be received by the application (712) and specifying the ending portion of the quantity of data (708) as the portion of the quantity of data to be discarded. Specifying (802) the beginning portion of the quantity of data (708) as the portion of the quantity of data (708) to be received by the application (712) and specifying the ending portion of the quantity of data (708) as the portion of the quantity of data to be discarded may be carried out, for example, by specifying a specification (716) in which a first portion of a predetermined size is identified as the portion (724) of the quantity of data (708) to be received by the application (712) and a second portion of a predetermined size is identified as the portion (730) of the quantity of data (708) that is to be discarded. The following C-style struct is an example of such a specification:

```
struct specification {
    byte keep1;
    byte keep2;
    byte discard1;
    byte discard2;
    byte discard3;
    byte discard4;
    byte discard5;
    byte discard6;
};
```

In the example of FIG. 8, specifying (722) a specification (716) of one or more portions of a quantity of data (708) to be received by the application (712) and one or more portions of the quantity of data (708) to be discarded can alternatively include specifying (804) the ending portion of the quantity of data (708) as the portion of the quantity of data (708) to be received by the application (712) and specifying the beginning portion of the quantity of data (708) as the portion of the quantity of data (708) to be discarded. Specifying (804) the ending portion of the quantity of data (708) as the portion of the quantity of data (708) to be received by the application (712) and specifying the beginning portion of the quantity of data (708) as the portion of the quantity of data (708) to be discarded may be carried out, for example, by specifying a specification (716) in which a first portion of a predetermined size is identified as the portion (730) of the quantity of data (708) to be discarded and a second portion of a predetermined size is identified as the portion (724) of the quantity of data (708) that is to be received by the application (712). The following C-style struct is an example of such a specification:

```
struct specification {
    byte discard1;
    byte discard2;
    byte discard3;
    byte discard4;
    byte discard5;
    byte discard6;
    byte keep1;
    byte keep2;
};
```

In the example of FIG. 8, specifying (722) a specification (716) of one or more portions of a quantity of data (708) to be received by the application (712) and one or more portions of the quantity of data (708) to be discarded can alternatively include specifying (806) an ordering of one or more portions of the quantity of data (708) to be received by the application (712), one or more portions of the quantity of data (708) to be discarded, and specifying a length for each portion. Specifying (806) an ordering of one or more portions of the quantity of data (708) to be received by the application (712), one or more portions of the quantity of data (708) to be discarded, and specifying a length for each portion may be carried out, for example, by specifying a specification (716) in which one or more portions of a predetermined size are identified as the portion (730) of the quantity of data (708) to be discarded and one or more portions of a predetermined size are identified as the portion (724) of the quantity of data (708) that is to be received by the application (712). The following C-style struct is an example of such a specification:

```
struct specification {
    byte discard1;
    byte keep1;
    byte discard2;
    byte discard3;
    byte discard4;
    byte keep2;
    byte discard5;
    byte discard6;
};
```

Example embodiments of the present invention are described largely in the context of a fully functional computer system for administering truncated receive functions in a PMI of a parallel computer. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of administering truncated receive functions in a parallel messaging interface ('PMI') of a parallel computer comprising a plurality of compute nodes coupled for data communications through the PMI and through a data communications network, the method comprising:
   sending, through the PMI on a source compute node, a quantity of data from the source compute node to a destination compute node;
   specifying, by the application on the destination compute node, a portion of the quantity of data to be received by the application on the destination compute node by specifying a beginning of the quantity of data and a portion of the quantity of data to be discarded by the destination compute node by specifying the ending portion of the quantity of the portion, wherein the portion of the quantity of data to be received by the application is a predetermined size;
   receiving, by the PMI on the destination compute node, all of the quantity of data;
   providing, by the PMI on the destination compute node to the application on the destination compute node, only the portion of the quantity of data to be received by the application by writing the portion of the quantity of data to be received into a receive buffer predefined by the application,
      wherein the portion of the quantity of data to be received by the application is a subset of all of the quantity of data, and
      wherein the receive buffer is an input buffer for the application that includes data to be processed by the application; and
   discarding, by the PMI on the destination compute node, the portion of the quantity of data to be discarded by writing the portion of the quantity of data to be discarded to a predefined throwaway buffer.

2. The method of claim 1 wherein specifying the portion of the quantity of data to be received by the application on the destination compute node and the portion of the quantity of data to be discarded further comprises:
specifying the beginning portion of the quantity of data as the portion of the quantity of data to be received by the application; and
specifying the ending portion of the quantity of data as the portion of the quantity of data to be discarded.

3. The method of claim 1 wherein specifying the portion of the quantity of data to be received by the application on the destination compute node and the portion of the quantity of data to be discarded further comprises:
specifying the ending portion of the quantity of data as the portion of the quantity of data to be received by the application; and
specifying the beginning portion of the quantity of data as the portion of the quantity of data to be discarded.

4. The method of claim 1 wherein specifying the portion of the quantity of data to be received by the application on the destination compute node and the portion of the quantity of data to be discarded further comprises specifying an ordering of one or more portions of the quantity of data to be received by the application, one or more portions of the quantity of data to be discarded, and specifying a length for each portion.

5. The method of claim 1 wherein discarding the portion of the quantity of data to be discarded further comprises writing sub-portions of the quantity of data to be discarded into a predefined throwaway buffer, wherein the size of the throwaway buffer is smaller than the size of the portion of the quantity of data to be discarded.

6. An apparatus for administering truncated receive functions in a parallel messaging interface ('PMI') of a parallel computer comprising a plurality of compute nodes coupled for data communications through the PMI and through a data communications network, the apparatus comprising a computer processor, a computer memory operatively coupled to the computer processor, the computer memory having disposed within it computer program instructions that, when executed by the computer processor, cause the apparatus to carry out the steps of:
sending, through the PMI on a source compute node, a quantity of data from the source compute node to a destination compute node;
specifying, by the application on the destination compute node, a portion of the quantity of data to be received by the application on the destination compute node by specifying a beginning of the quantity of data and a portion of the quantity of data to be discarded by the destination compute node by specifying the ending portion of the quantity of the portion, wherein the portion of the quantity of data to be received by the application is a predetermined size;
receiving, by the PMI on the destination compute node, all of the quantity of data;
providing, by the PMI on the destination compute node to the application on the destination compute node, only the portion of the quantity of data to be received by the application by writing the portion of the quantity of data to be received into a receive buffer predefined by the application,
wherein the portion of the quantity of data to be received by the application is a subset of all of the quantity of data, and
wherein the receive buffer is an input buffer for the application that includes data to be processed by the application; and
discarding, by the PMI on the destination compute node, the portion of the quantity of data to be discarded by writing the portion of the quantity of data to be discarded to a predefined throwaway buffer.

7. The apparatus of claim 6 wherein specifying the portion of the quantity of data to be received by the application on the destination compute node and the portion of the quantity of data to be discarded further comprises:
specifying the beginning portion of the quantity of data as the portion of the quantity of data to be received by the application; and
specifying the ending portion of the quantity of data as the portion of the quantity of data to be discarded.

8. The apparatus of claim 6 wherein specifying the portion of the quantity of data to be received by the application on the destination compute node and the portion of the quantity of data to be discarded further comprises:
specifying the ending portion of the quantity of data as the portion of the quantity of data to be received by the application; and
specifying the beginning portion of the quantity of data as the portion of the quantity of data to be discarded.

9. The apparatus of claim 6 wherein specifying the portion of the quantity of data to be received by the application on the destination compute node and the portion of the quantity of data to be discarded further comprises specifying an ordering of one or more portions of the quantity of data to be received by the application, one or more portions of the quantity of data to be discarded, and specifying a length for each portion.

10. The apparatus of claim 6 wherein discarding the portion of the quantity of data to be discarded further comprises writing sub-portions of the quantity of data to be discarded into a predefined throwaway buffer, wherein the size of the throwaway buffer is smaller than the size of the portion of the quantity of data to be discarded.

11. A computer program product for administering truncated receive functions in a parallel messaging interface ('PMI') of a parallel computer comprising a plurality of compute nodes coupled for data communications through the PMI and through a data communications network, the computer program product comprising a computer readable non-transitory storage medium that includes computer program instructions that, when executed, cause a computer to carry out the steps of:
sending, through the PMI on a source compute node, a quantity of data from the source compute node to a destination compute node;
specifying, by the application on the destination compute node, a portion of the quantity of data to be received by the application on the destination compute node by specifying a beginning of the quantity of data and a portion of the quantity of data to be discarded by the destination compute node by specifying the ending portion of the quantity of the portion, wherein the portion of the quantity of data to be received by the application is a first predetermined size;
receiving, by the PMI on the destination compute node, all of the quantity of data;
providing, by the PMI on the destination compute node to the application on the destination compute node, only the portion of the quantity of data to be received by the application by writing the portion of the quantity of data to be received into a receive buffer predefined by the application,
wherein the portion of the quantity of data to be received by the application is a subset of all of the quantity of data, and wherein the receive buffer is an input buffer for the application that includes data to be processed by the application; and discarding, by the PMI on the destination compute node, the portion of the quantity of data to be discarded by writing the portion of the quantity of data to be discarded to a predefined throwaway buffer.

12. The computer program product of claim 11 wherein specifying the portion of the quantity of data to be received by the application on the destination compute node and the portion of the quantity of data to be discarded further comprises:

specifying the beginning portion of the quantity of data as the portion of the quantity of data to be received by the application; and specifying the ending portion of the quantity of data as the portion of the quantity of data to be discarded.

13. The computer program product of claim 11 wherein specifying the portion of the quantity of data to be received by the application on the destination compute node and the portion of the quantity of data to be discarded further comprises:

specifying the ending portion of the quantity of data as the portion of the quantity of data to be received by the application; and specifying the beginning portion of the quantity of data as the portion of the quantity of data to be discarded.

14. The computer program product of claim 11 wherein specifying the portion of the quantity of data to be received by the application on the destination compute node and the portion of the quantity of data to be discarded further comprises specifying an ordering of one or more portions of the quantity of data to be received by the application, one or more portions of the quantity of data to be discarded, and specifying a length for each portion.

15. The computer program product of claim 11 discarding the portion of the quantity of data to be discarded further comprises writing sub-portions of the quantity of data to be discarded into a predefined throwaway buffer, wherein the size of the throwaway buffer is smaller than the size of the portion of the quantity of data to be discarded.

* * * * *